No. 762,116. PATENTED JUNE 7, 1904.
M. H. BAKER & S. P. WILBUR.
ELECTRIC ARC LAMP.
APPLICATION FILED DEC. 8, 1902.
NO MODEL.
2 SHEETS—SHEET 2.
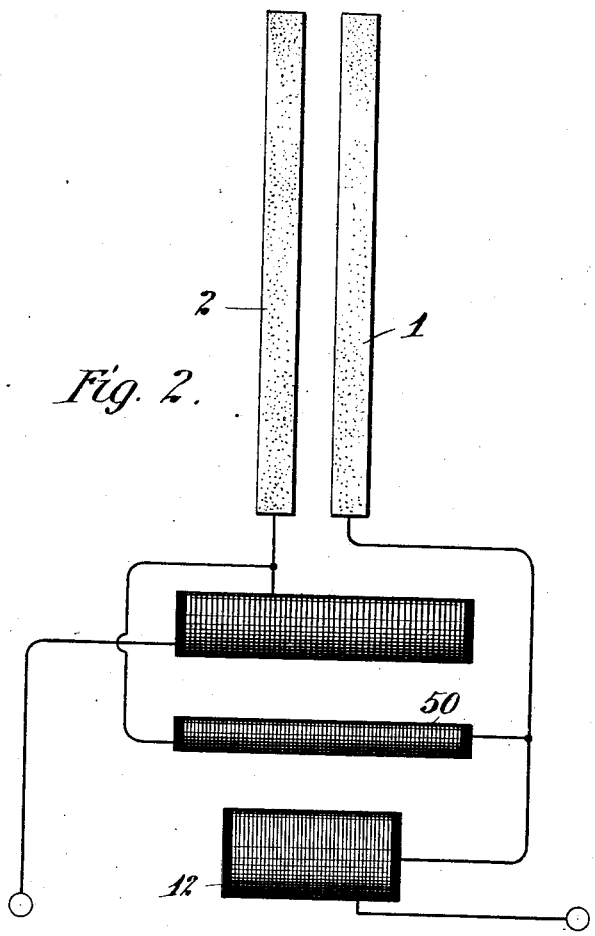
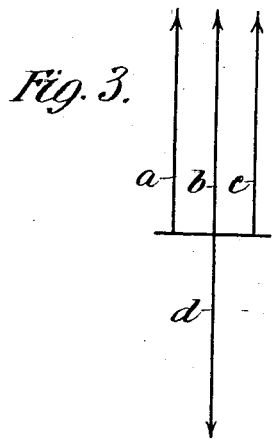
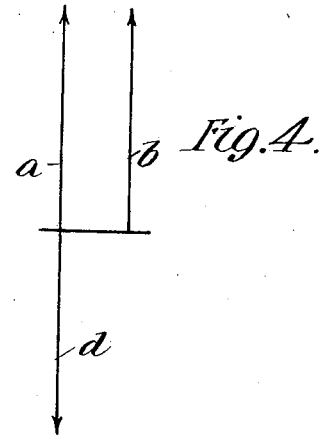

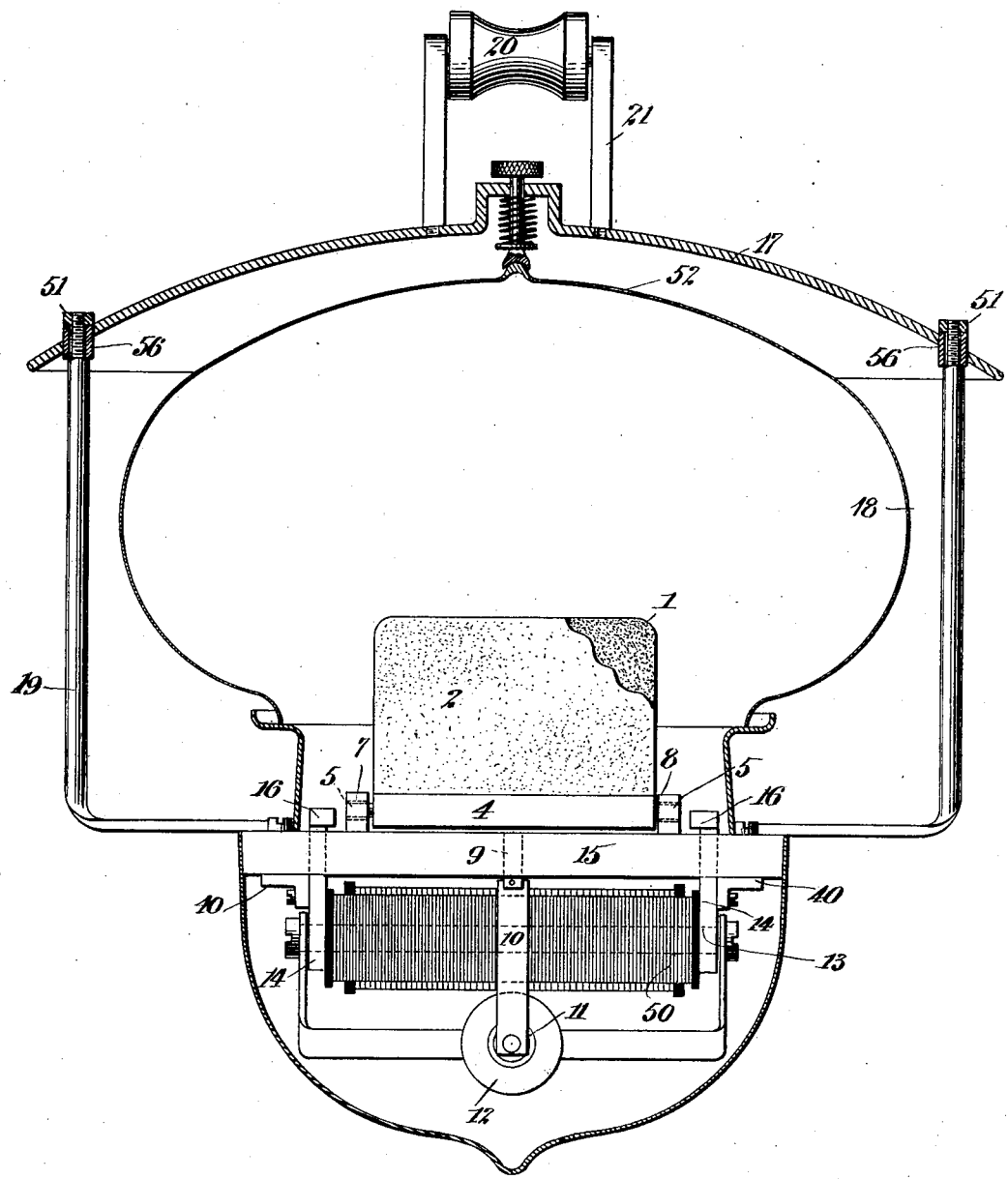

No. 762,116. Patented June 7, 1904.

UNITED STATES PATENT OFFICE.

MALCOLM H. BAKER, OF NEW YORK, N. Y., AND SAMUEL P. WILBUR, OF WILKINSBURG, PENNSYLVANIA, ASSIGNORS TO WESTINGHOUSE ELECTRIC & MANUFACTURING COMPANY, A CORPORATION OF PENNSYLVANIA.

ELECTRIC-ARC LAMP.

SPECIFICATION forming part of Letters Patent No. 762,116, dated June 7, 1904.

Application filed December 8, 1902. Serial No. 134,416. (No model.)

*To all whom it may concern:*

Be it known that we, MALCOLM H. BAKER, a resident of New York, in the county and State of New York, and SAMUEL P. WILBUR, a resident of Wilkinsburg, in the county of Allegheny and State of Pennsylvania, citizens of the United States, have invented certain new and useful Improvements in Electric-Arc Lamps, of which the following is a specification.

The object of the present invention is to provide an arc-lamp which while employing electrodes consisting of a mixture of metallic salts and carbon shall maintain an arc free from all flickering and unsteadiness.

A further object is to so diffuse and soften the light from the arc as to render the lamp particularly adaptable for inside and store lighting and also for the examination of colors and similar work.

A further object is to provide for an even and shadowless illumination beneath the lamp.

A further object is to provide means for governing the distribution of the light, so that it may be diffused over a large area beneath the lamp or concentrated within a comparatively small radius.

A further object is to increase the trim life of the lamp to one hundred hours.

A further object is to provide a short compact lamp adaptable for use under low ceilings.

It is now well understood in the art that the addition of certain metallic salts to the carbon electrodes of an arc-lamp produces an arc or vapor bridge of greatly-increased luminosity, and, further, that the addition of the said salts produces a greater amount of impurities of combustion, so that the said arc is difficult to inclose, owing to the deposit of these impurities upon the surface of the inclosing bulb. It has been customary in lamps employing such electrodes to point both of the said electrodes down and establish the arc across the lower ends; also, to hold the arc in position and to fan or spread it out by means of a governing magnetic field. When burning in this manner, it is evident that the heat of the arc creates an updraft and that this draft acting against the downward pull of the magnetic field tends to throw the arc out of a vertical position—that is, tends to bend the arc to one side and to force it toward the sides of the electrodes. This difficulty is largely overcome by surrounding the arc with a small chamber; but where large electrodes of the plate form are used the size of this chamber becomes too great to allow of its properly confining the heated air.

The varying position of the arc above described is slight and in no way noticeable in street or similar lighting; but for inside or store lighting and for the close examination of colors or goods means must be provided for producing an arc of the same uniformity and steadiness as the inclosed arc. We accomplish this in the following manner, reference being had to the annexed drawings: Two electrodes in the form of thin broad plates are mounted vertically and parallel in two suitable holders and the arc established across the upper ends. This arc assumes and maintains a vertical upward-pointing position under the combined influence of its own local-current field and the up air-draft created. If allowed to burn in this position, it rapidly increases in length, becomes wavering and unstable, and usually ruptures. In order to restrain this action, I locate a magnetic field below the arc and energize this field by a winding-in shunt to the arc of such direction that the said magnetic field attracts the arc down, shortening it and lowering the voltage. The operation is now as follows: The local field of the arc and the air-draft, both now acting in the same upward direction, are constant forces, it being assumed that the current in the circuit is approximately constant. The only variable, therefore, is the attractive action of the shunt magnetic field, which varies with the voltage of the arc. Should the arc tend to flame and increase in voltage, a proportional increase takes place in the magnetic field and the arc is restored to the normal condition. Similarly, should the voltage drop a decrease in the field strength takes place, again restoring normal conditions. By these means—that is, by causing the local field of the arc and the air-draft to act constantly and in unison and by governing the arc by a strong shunt-field—a light of great steadiness and uniformity is produced and all flicker or wavering eliminated. In order to suitably diffuse the light and direct it beneath the lamp, we provide a large reflector above the arc and by varying the shape of the said reflector are enabled to change the area illuminated as desired. By the use of electrodes in the form of plates we attain a large increase in cubical contents, and thereby an increase in life.

Our invention is illustrated in the accompanying drawings, in which—

Figure 1 is a vertical section through one of our lamps. Fig. 2 is a diagram of the lamp-circuit under one arrangement, and Figs. 3 and 4 are graphic illustrations of the action of the various governing forces upon the arc.

Referring to the drawings, 1 and 2 are the electrodes, the same being clamped in suitable holders, one of which is shown at 4 in Fig. 1. The holder of the electrode 1 is fixed, while the holder 4 of the electrode 2 is movable on pivots 5 and 6, set in supports 7 and 8 in such a manner that the holder 4 and the carbon 2 may be swung so as to bring the upper edge of the electrode 2 into contact with the corresponding edge of the electrode 1. A rod 9, fixed to the holder 4, passes up through the bed-plate 15 of the lamp and is attached to a flat spring 10. This spring carries the core 11 of a series starting-magnet 12.

In order to govern and regulate the arc, a core 13 is mounted by means of arms 14 14 and angle-pieces 40 40 upon the bed-plate 15. This core 13 carries a winding 50 in shunt to the arc. The arms 14 14 extend through the bed-plate, and to their upper ends are secured pole-pieces 16 16, thus forming the desired governing magnetic field.

In order to suitably diffuse the light, we place a reflector 17, of metal, above the globe of the lamp, the globe appearing at 18. For the convenient suspension of the lamp we support the reflector 17 by means of side rods 19, secured on the bed-plate 15, and we support upon the reflector a suitable hanger 21, carrying an insulator 20, by means of which the lamp can be suspended from a suitable support. The means of attachment as between the reflector 17 and the side rods 19 19 are hollow nuts 50 50 and jam-nuts 51 51, the latter being adapted to fit the screw-threaded upper ends of the side rods 19 19.

Figs. 3 and 4 represent graphically the action of the various governing forces upon the arc. In Fig. 3 we have an illustration of the forces when both a series and a shunt magnetic governing field are employed, as may sometimes be the case. Fig. 4 shows the conditions when the series field is dispensed with. In these figures, $a$ represents the local field of the arc, $b$ the force exerted by the upward air-draft, and $c$ the force exerted by the series magnetic field. These three forces all combine to throw the arc upward and spread it out, thus increasing the voltage. In order to restrain the arc within the normal voltage limits, these forces are opposed by the downward pull of the shunt magnetic field, this downward pull being represented by $d$. It is evident that stability of operation at the normal voltage is obtained by so adjusting the strength of $d$ at the said normal voltage as to hold the forces $a$, $b$, $c$, and $d$ in equilibrium at the same voltage. In order to understand the means by which this arrangement produces increased steadiness of operation, it is to be noted that the force $b$ (the air-draft) here acts constantly and without deviation in direction in distinction from the ordinary lamp, wherein, as explained, this force acts variably, and thus throws the arc out of line. In Fig. 4 the series field is omitted; otherwise the same conditions prevail. The question of the omission of the said series field or the use of such a field depends upon whether alternating current or direct current is employed. In direct-current service the force of the local field is greater than with alternating current, and therefore the series field is not so important.

The electrical connections of the lamp are shown in Fig. 2, which explains itself.

In place of the flat-plate electrodes shown other forms of electrodes might be employed—such as pencil-electrodes, corrugated electrodes, or any preferred form.

An additional point of advantage possessed by this lamp is that the air-draft tends to carry the impurities of combustion upward, and they are either deposited upon the upper surface of the globe 18 or upon the reflector 17 in case an opening, such as is indicated at 52 in Fig. 1, is made in the globe.

The form which the lamp naturally assumes adapts it for being placed upon the tops of trolley-poles or other poles whereby it is made convenient for street service.

We claim as our invention—

1. In an electric-arc lamp, a pair of upwardly-directed electrodes so disposed that the arc is spread by the natural air-draft and by the local field of the arc, and means for controlling the arc, consisting of a shunt-field acting in opposition to the local field and the air-draft.

2. In an electric-arc lamp, a pair of upwardly-directed electrodes, so disposed that the arc is spread by the natural air-draft and by its own local field, in combination with a series field adapted to assist the spreading of the arc, and a shunt-field acting in opposition to the series field, the local arc-field and the air-draft.

3. In an electric-arc lamp, a pair of upwardly-directed electrodes, and means for governing the arc between them and causing it to burn steadily at a predetermined voltage, such means consisting of two or more constant forces acting to spread the arc in an upward direction, and an opposing force consisting of a shunt magnetic field adapted to respond to variations of voltage at the arc.

Signed at New York, in the county and State of New York, this 26th day of November, 1902.

MALCOLM H. BAKER.

Witnesses:
WM. H. CAPEL,
GEORGE H. STOCKBRIDGE.

Signed at Pittsburg, in the county of Allegheny and State of Pennsylvania, this 1st day of December, 1902.

SAMUEL P. WILBUR.

Witnesses:
WESLEY G. CARR,
BIRNEY HINES.